(12) United States Patent
Minami

(10) Patent No.: US 11,126,700 B2
(45) Date of Patent: Sep. 21, 2021

(54) INFORMATION PROCESSING APPARATUS, INFORMATION PROCESSING METHOD AND STORAGE MEDIUM

(71) Applicant: Casio Computer Co., Ltd., Tokyo (JP)

(72) Inventor: Kazuhiro Minami, Kawaguchi (JP)

(73) Assignee: Casio Computer Co., Ltd., Tokyo (JP)

( * ) Notice: Subject to any disclaimer, the term of this patent is extended or adjusted under 35 U.S.C. 154(b) by 351 days.

(21) Appl. No.: 16/014,185

(22) Filed: Jun. 21, 2018

(65) Prior Publication Data

US 2018/0373853 A1    Dec. 27, 2018

(30) Foreign Application Priority Data

Jun. 22, 2017    (JP) .............................. JP2017-122111

(51) Int. Cl.
| | | |
|---|---|---|
| *H04L 29/00* | (2006.01) | |
| *G06F 15/16* | (2006.01) | |
| *G06F 7/04* | (2006.01) | |
| *G06F 21/31* | (2013.01) | |
| *G06Q 10/00* | (2012.01) | |
| *G06F 21/62* | (2013.01) | |
| *G06F 21/60* | (2013.01) | |

(52) U.S. Cl.
CPC ............ *G06F 21/31* (2013.01); *G06F 21/604* (2013.01); *G06F 21/6218* (2013.01); *G06Q 10/00* (2013.01)

(58) Field of Classification Search
CPC .... G06F 21/31; G06F 21/604; G06F 21/6218; G06Q 10/00
USPC ........................................................... 726/5
See application file for complete search history.

(56) References Cited

U.S. PATENT DOCUMENTS

2012/0215684 A1* 8/2012 Kidron .................. G06F 15/167
705/39
2012/0307279 A1* 12/2012 Yoshida ............. H04N 1/00477
358/1.13

(Continued)

FOREIGN PATENT DOCUMENTS

| JP | 2004-133549 A | 4/2004 |
|---|---|---|
| JP | 2004-240637 A | 8/2004 |

(Continued)

OTHER PUBLICATIONS

Longhua Zhang, A Rule-Based Framework for Role-Based Delegation and Revocation, ACM Transactions on Information and System Security, vol. 6, No. 3, Aug. 2003, pp. 404-441.*

(Continued)

*Primary Examiner* — Monjur Rahim
(74) *Attorney, Agent, or Firm* — Fitch, Even, Tabin & Flannery LLP

(57) ABSTRACT

An information processing apparatus includes a processor that functions as a login section, an accepting section, a notifying section and a removing section. The login section performs a login process based on a predetermined account assigned to a first user. The accepting section accepts a use request of a predetermined function from the first user when the login process has been performed by the login section. The notifying section notifies a second user about the use request accepted by the accepting section. The removing section removes prohibition on execution of a process relevant to the predetermined function based on removal instruction information from the second user notified by the notifying section.

6 Claims, 12 Drawing Sheets

(56) References Cited

U.S. PATENT DOCUMENTS

2013/0191898 A1* 7/2013 Kraft .................. G06F 21/31
    726/6
2015/0310188 A1* 10/2015 Ford .................. H04L 63/0428
    726/28
2017/0148000 A1* 5/2017 Hopen ................ G06Q 20/105

FOREIGN PATENT DOCUMENTS

| JP | 2004258965 A | 9/2004 |
|----|----|----|
| JP | 2008-139962 A | 6/2008 |
| JP | 4814130 B2 * | 11/2011 |
| JP | 2012-248116 A | 12/2012 |
| WO | 2010050406 A1 | 5/2010 |

OTHER PUBLICATIONS

JPO; Application No. 2017-122111; Notice of Reasons for Refusal dated Oct. 29, 2019.
Nakai From Foundations of Etsuji and Amazon EC2/S3 up to In-company Cloud Employment Design A Guide to Cloud Practical Use Programming, SoftwareDesign, Japan, Technical Hyoronsha, Oct. 18, 2010, Publication No. 240, pp. 49-54.
JPO; Application No. 2017-122111; Notice of Reasons for Refusal dated Jun. 2, 2020.
JPO; Application No. 2017-122111; Decision of Dismissal of Amendment dated Jan. 5, 2021.

* cited by examiner

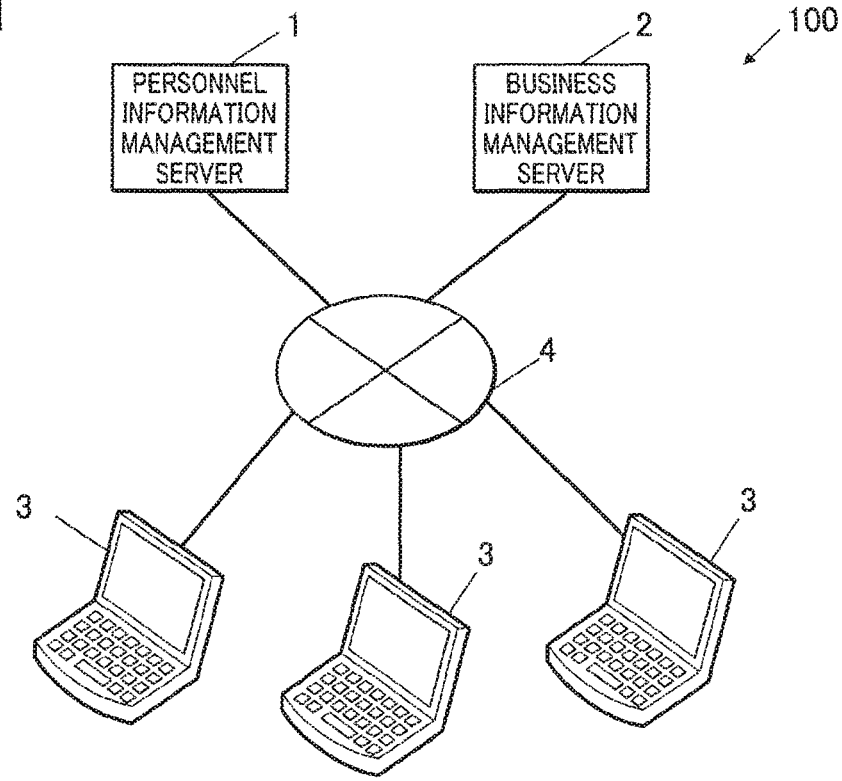
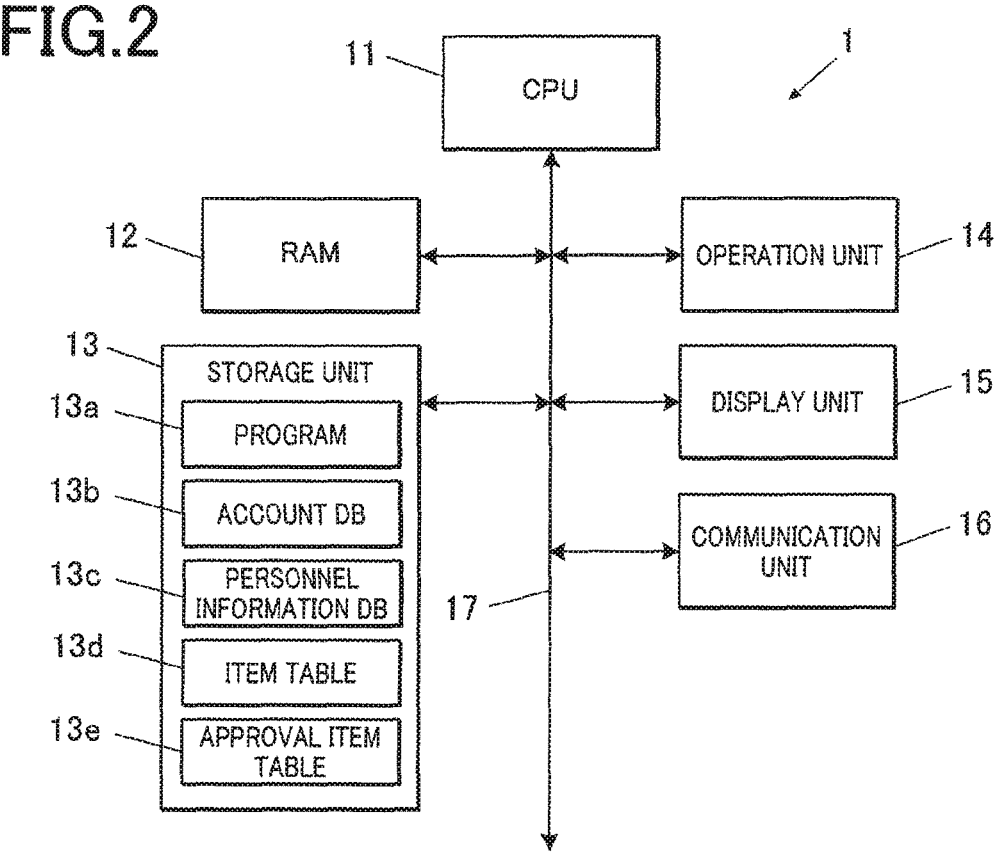

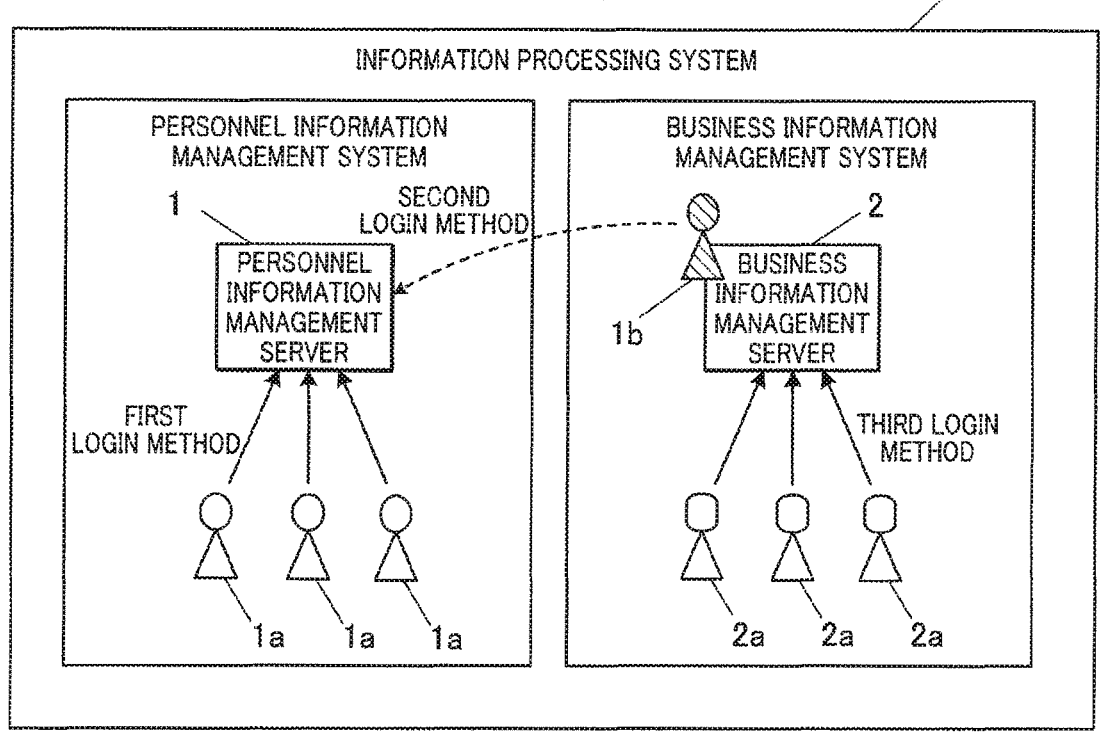
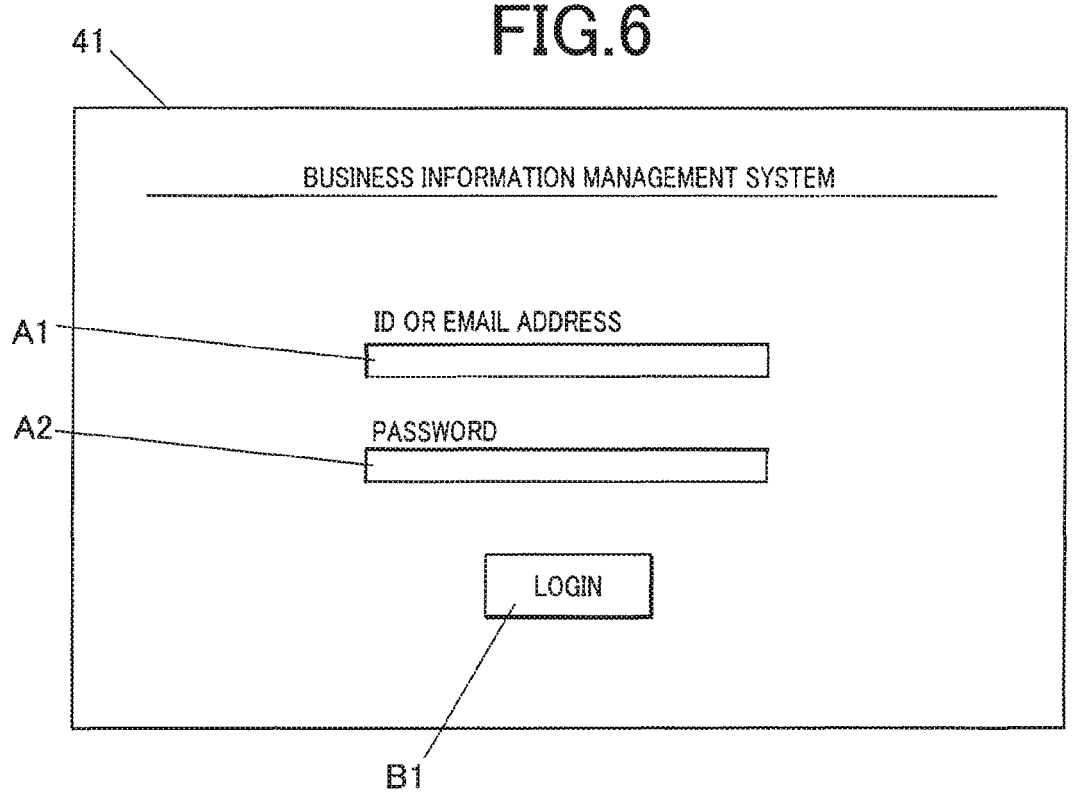

FIG.9

| ITEM ID | ITEM NAME | EXECUTABILITY |
|---|---|---|
| 101 | ENTRY IN EMPLOYEE BOOK | INEXECUTABLE |
| 102 | PRINTING OF EMPLOYEE BOOK | INEXECUTABLE |
| 103 | ENTRY IN WAGE BOOK | INEXECUTABLE |
| 104 | PRINTING OF WAGE BOOK | INEXECUTABLE |
| 105 | ENTRY IN SALARY BOOK | INEXECUTABLE |
| 106 | PRINTING OF SALARY BOOK | INEXECUTABLE |
| 107 | REFERENCE TO EMPLOYEE BOOK | INEXECUTABLE |
| 108 | REFERENCE TO SALARY BOOK | INEXECUTABLE |

USE REQUEST SCREEN

PERSONNEL INFORMATION MANAGEMENT SYSTEM

| | | |
|---|---|---|
| REQUESTER NAME | ICHIRO SATO | A3 |
| EMAIL ADDRESS | xxx.yyy@abc.com | A4 |
| EMPLOYEE NUMBER | 001234 | A5 |
| CATEGORY OF INTENDED USE | 101 LABOR | A6 |
| INTENDED USE | TO CONFIRM CONTENTS OF APPLICATION FOR PAYMENT OF MATERNITY BENEFIT OF HEALTH INSURANCE | A7 |
| USING DATE AND TIME (BEGIN) | APRIL 18, 2017    10:00 | A8 |
| USING DATE AND TIME (END) | APRIL 18, 2017    17:00 | A9 |

RETURN    REQUEST

REQUEST STATUS LIST SCREEN

PERSONNEL INFORMATION MANAGEMENT SYSTEM

| REQUEST NO. | LOGIN ACCOUNT | CATEGORY OF INTENDED USE | USING DATE AND TIME (BEGIN) | USING DATE AND TIME (END) | STATUS |
|---|---|---|---|---|---|
| 001 | user01 | 101 LABOR | 2017/4/18 10:00 | 2017/4/18 17:00 | NOT YET |

[TO REQUEST SCREEN] [LOGOUT] [TO MENU SCREEN]

From: PERSONNEL INFORMATION MANAGEMENT SYSTEM
　　　　<formsender@abcjinji.com>
Sent: Tuesday, April 18 9:48 AM
To: xxx.yyy@abc.com
Subject: APPROVAL FOR REQUEST FOR USE OF PERSONNEL
　　　　INFORMATION MANAGEMENT SYSTEM YOUR REQUEST FOR USE OF PERSONNEL INFORMATION
MANAGEMENT SYSTEM FOR THE PERIOD BELOW HAS BEEN
APPROVED.

USABLE PERIOD(BEGIN) : 2017/4/18 10:00
USABLE PERIOD(END) : 2017/4/18 17:00

FIG.13

REQUEST STATUS LIST SCREEN (53)

PERSONNEL INFORMATION MANAGEMENT SYSTEM

| REQUEST NO. | LOGIN ACCOUNT | CATEGORY OF INTENDED USE | USING DATE AND TIME (BEGIN) | USING DATE AND TIME (END) | STATUS |
|---|---|---|---|---|---|
| 001 | user01 | 101 LABOR | 2017/4/18 10:00 | 2017/4/18 17:00 | APPROVED |

[TO REQUEST SCREEN] B10  [LOGOUT] B11  [TO MENU SCREEN] B25

FIG.14

MENU SCREEN (54)

PERSONNEL INFORMATION MANAGEMENT SYSTEM

USABLE PERIOD 2017/4/18 10:00 – 2017/4/18 17:00

B5:
- ENTRY IN EMPLOYEE BOOK
- PRINTING OF EMPLOYEE BOOK
- ENTRY IN WAGE BOOK
- PRINTING OF WAGE BOOK
- ENTRY IN SALARY BOOK
- PRINTING OF SALARY BOOK
- REFERENCE TO EMPLOYEE BOOK
- REFERENCE TO SALARY BOOK

[RETURN] B12  [LOGOUT] B13

FIG.17

REQUEST STATUS LIST SCREEN

PERSONNEL INFORMATION MANAGEMENT SYSTEM

| REQUEST NO. | LOGIN ACCOUNT | CATEGORY OF INTENDED USE | USING DATE AND TIME (BEGIN) | USING DATE AND TIME (END) | STATUS |
|---|---|---|---|---|---|
| 001 | user01 | 101 LABOR | 2017/4/18 10:00 | 2017/4/18 17:00 | NOT YET |
| 002 | user02 | 105 HEALTH INSURANCE | 2017/4/19 10:00 | 2017/5/18 18:00 | NOT YET |
| 003 | user03 | 101 LABOR | 2017/4/21 9:00 | 2017/4/30 12:00 | NOT YET |

[TO MENU SCREEN] B17    [LOGOUT] B18

FIG.18

APPROVAL SCREEN                                       REQUEST NO.001

PERSONNEL INFORMATION MANAGEMENT SYSTEM

| REQUESTER NAME | ICHIRO SATO |
|---|---|
| EMAIL ADDRESS | xxx.yyy@abc.com |
| EMPLOYEE NUMBER | 001234 |
| CATEGORY OF INTENDED USE | 101 LABOR |
| INTENDED USE | TO CONFIRM CONTENTS OF APPLICATION FOR PAYMENT OF MATERNITY BENEFIT OF HEALTH INSURANCE |
| USING DATE AND TIME (BEGIN) | APRIL 18, 2017    10:00 |
| USING DATE AND TIME (END) | APRIL 18, 2017    17:00 |

[APPROVE] B19    [REJECT] B20    [RETURN] B21

FIG.19A

ITEM UPDATE SCREEN

PERSONNEL INFORMATION MANAGEMENT SYSTEM

| ITEM NAME | EXECUTABILITY |
|---|---|
| ENTRY IN EMPLOYEE BOOK | INEXECUTABLE |
| PRINTING OF EMPLOYEE BOOK | INEXECUTABLE |
| ENTRY IN WAGE BOOK | INEXECUTABLE |
| PRINTING OF WAGE BOOK | INEXECUTABLE |
| ENTRY IN SALARY BOOK | INEXECUTABLE |
| PRINTING OF SALARY BOOK | INEXECUTABLE |
| REFERENCE TO EMPLOYEE BOOK | INEXECUTABLE |
| REFERENCE TO SALARY BOOK | INEXECUTABLE |

[ENTER] B22  [RETURN] B23

FIG.19B

ITEM UPDATE SCREEN

PERSONNEL INFORMATION MANAGEMENT SYSTEM

| ITEM NAME | EXECUTABILITY |
|---|---|
| ENTRY IN EMPLOYEE BOOK | INEXECUTABLE |
| PRINTING OF EMPLOYEE BOOK | INEXECUTABLE |
| ENTRY IN WAGE BOOK | INEXECUTABLE |
| PRINTING OF WAGE BOOK | INEXECUTABLE |
| ENTRY IN SALARY BOOK | INEXECUTABLE |
| PRINTING OF SALARY BOOK | INEXECUTABLE |
| REFERENCE TO EMPLOYEE BOOK | EXECUTABLE |
| REFERENCE TO SALARY BOOK | EXECUTABLE |

[ENTER] B22  [RETURN] B23

FIG.20

| LOGIN ACCOUNT | ITEM ID | ITEM NAME | EXECUTABILITY | APPROVER ACCOUNT |
|---|---|---|---|---|
| user01 | 101 | ENTRY IN EMPLOYEE BOOK | INEXECUTABLE | adm01 |
| user01 | 102 | PRINTING OF EMPLOYEE BOOK | INEXECUTABLE | adm01 |
| user01 | 103 | ENTRY IN WAGE BOOK | INEXECUTABLE | adm01 |
| user01 | 104 | PRINTING OF WAGE BOOK | INEXECUTABLE | adm01 |
| user01 | 105 | ENTRY IN SALARY BOOK | INEXECUTABLE | adm01 |
| user01 | 106 | PRINTING OF SALARY BOOK | INEXECUTABLE | adm01 |
| user01 | 107 | REFERENCE TO EMPLOYEE BOOK | EXECUTABLE | adm01 |
| user01 | 108 | REFERENCE TO SALARY BOOK | EXECUTABLE | adm01 |

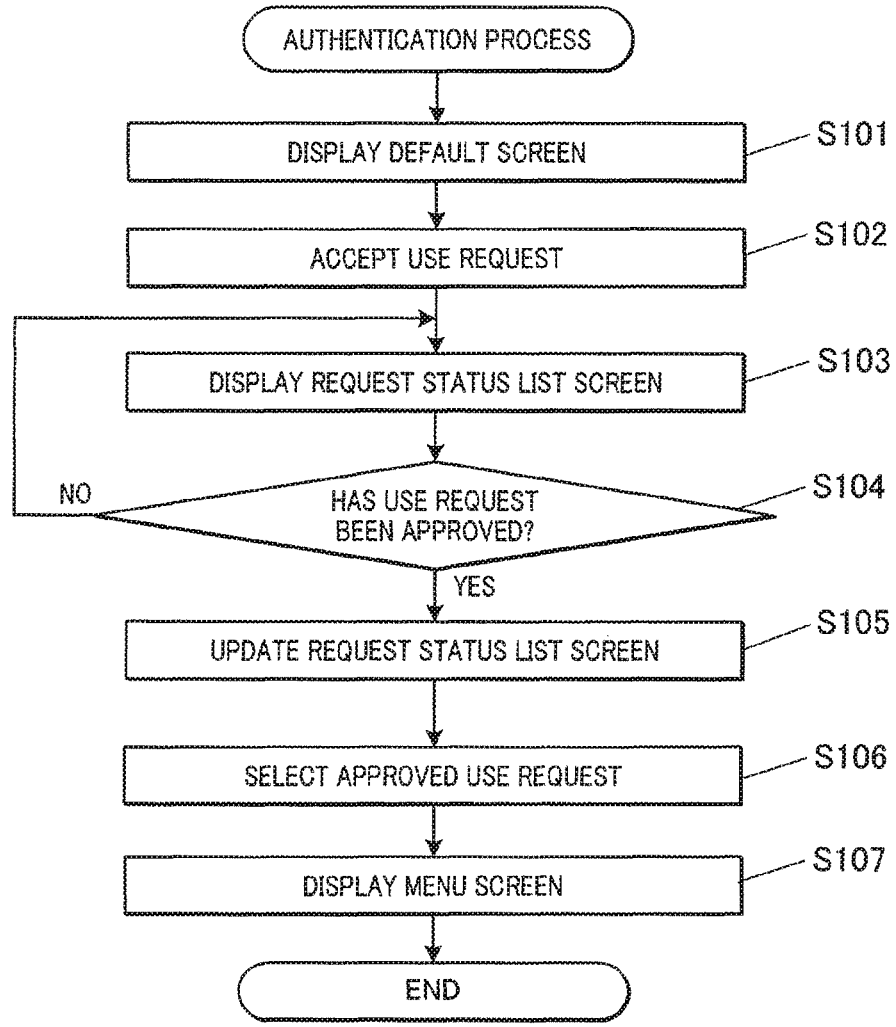

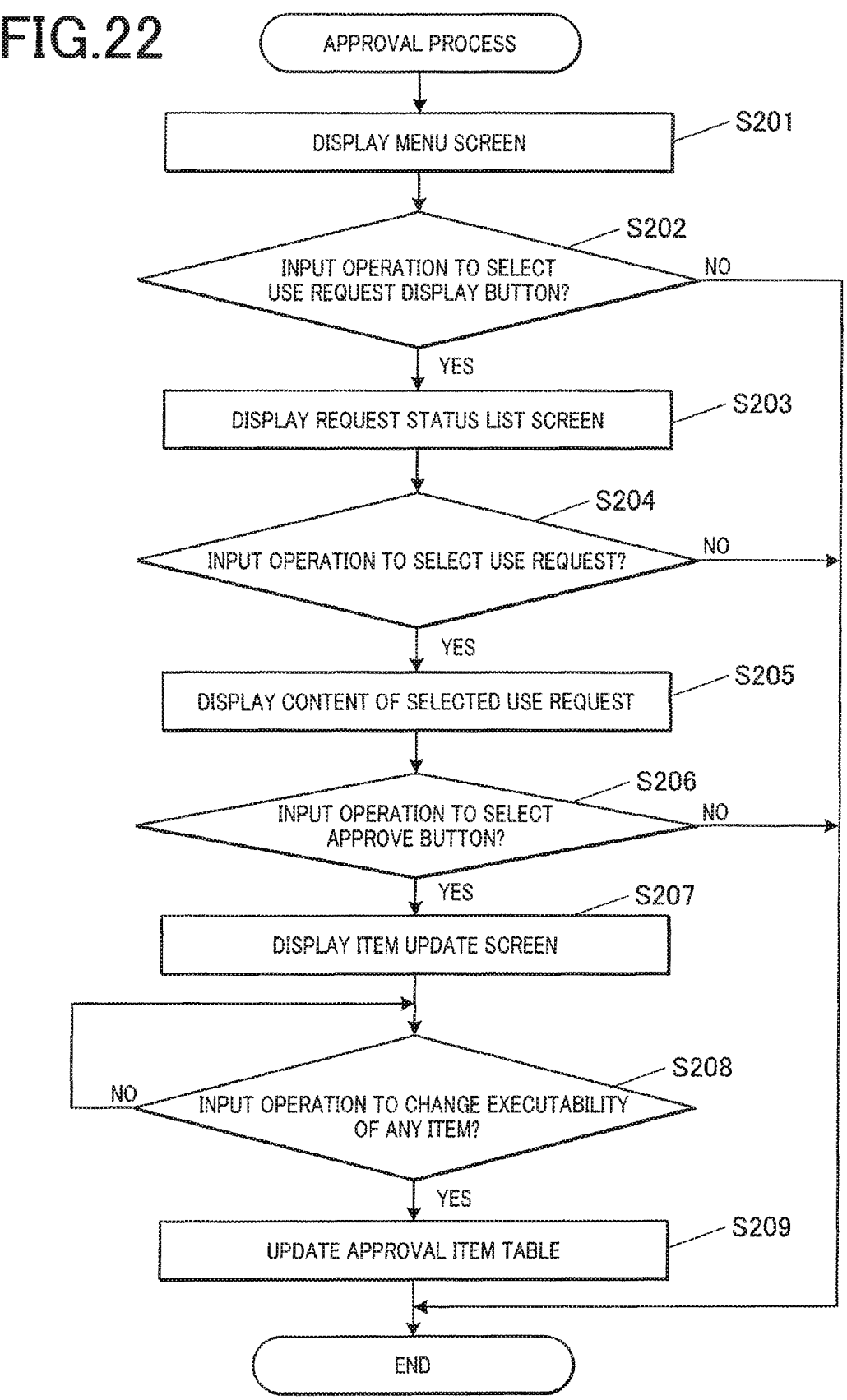

INFORMATION PROCESSING APPARATUS, INFORMATION PROCESSING METHOD AND STORAGE MEDIUM

CROSS-REFERENCE TO RELATED APPLICATIONS

This application is based upon and claims the benefit of priority from the prior Japanese Patent Application No. 2017-122111 filed on Jun. 22, 2017, the entire contents of which are incorporated herein by reference.

BACKGROUND OF THE INVENTION

1. Field of the Invention

The present invention relates to an information processing apparatus, an information processing method and a storage medium.

2. Description of the Related Art

There is an information processing apparatus that ensures security of information by authenticating a user(s) and removing prohibition on execution of processes relevant to functions only if authentication of the user succeeds. As a method for removing the prohibition on the execution thereof in the information processing apparatus, there is widely used a method of accepting input of authentication information from a user and removing the prohibition on the execution thereof if the input authentication information matches preregistered authentication information.

It may be desired that usable/available functions of the above-described information processing apparatus be made to differ depending on users. For such a case, there is known a method of issuing, from a system manager to each user, an account which permits the user to use only a function(s) that the user needs. (Refer to, for example, Japanese Patent Application Publication No. 2004-258965.)

However, the method disclosed in Japanese Patent Application Publication No. 2004-258965 increases the number of accounts to be issued according to the number of users. This increases the system manager's load of account management, which is a problem.

SUMMARY OF THE INVENTION

According to an aspect of the present invention, there is provided an information processing apparatus including a processor that functions as: a login section that performs a login process based on a predetermined account assigned to a first user; an accepting section that accepts a use request of a predetermined function from the first user when the login process has been performed by the login section; a notifying section that notifies a second user about the use request accepted by the accepting section; and a removing section that removes prohibition on execution of a process relevant to the predetermined function based on removal instruction information from the second user notified by the notifying section.

BRIEF DESCRIPTION OF THE SEVERAL VIEWS OF DRAWING

The accompanying drawings, which are incorporated in and constitute a part of the specification, illustrate embodiments of the invention, and together with the general description given above and the detailed description of the embodiments given below, serve to explain the principles of the invention, wherein:

FIG. 1 shows a schematic configuration of an information processing system;

FIG. 2 is a block diagram showing a functional configuration of a personnel information management server;

FIG. 5 is a schematic view to explain login methods for logging in to a personnel information management system and a business information management system;

FIG. 6 shows a login screen to log in to the business information management system;

FIG. 9 shows an example of contents of an item table;

FIG. 10 shows a use request screen of the personnel information management system;

FIG. 11 shows a request status list screen displayed after a use request is made;

FIG. 12 shows an example of contents of an email sent when a use request has been approved;

FIG. 13 shows the request status list screen in a state in which a use request has been approved;

FIG. 14 shows a menu screen of the personnel information management system;

FIG. 17 shows a request status list screen;

FIG. 18 shows an approval screen;

FIG. 19A shows an item update screen before updating (i.e. in a default state);

FIG. 19B shows the item update screen after updating;

FIG. 20 shows an example of contents of an approval item table;

FIG. 21 is a flowchart showing a control procedure of an authentication process; and FIG. 22 is a flowchart showing a control procedure of an approval process.

DETAILED DESCRIPTION OF THE INVENTION

Configuration of Information Processing System

Figure 3:
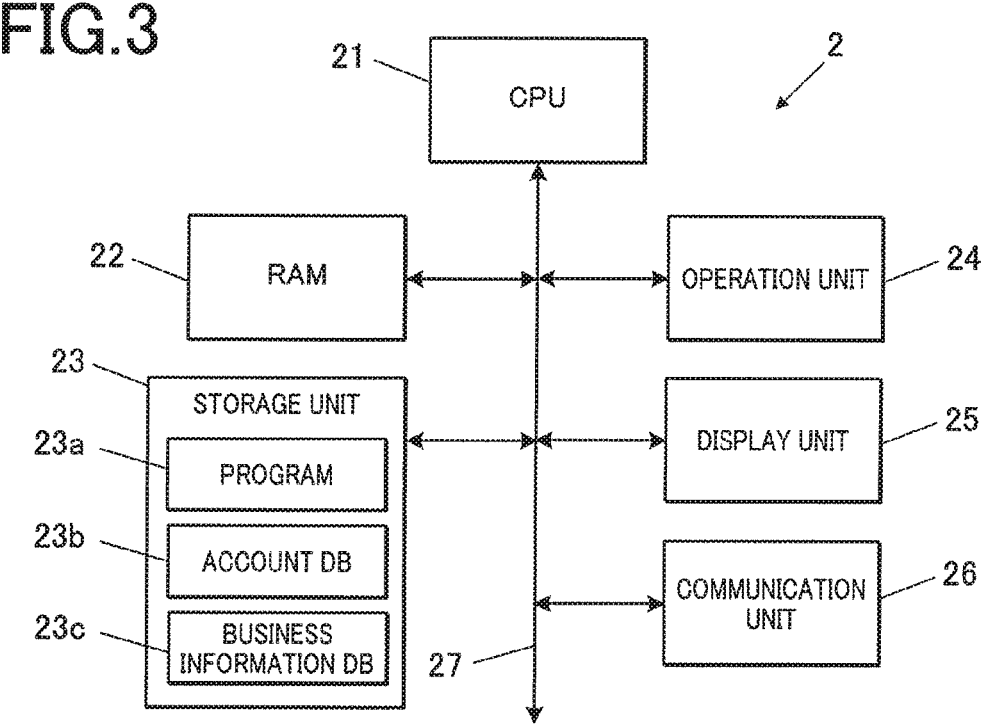
FIG. 3 is a block diagram showing a functional configuration of a business information management server.

First, a schematic configuration of an information processing system 100 is described with reference to FIG. 1.

FIG. 1 shows the schematic configuration of the information processing system 100.

As shown in FIG. 1, the information processing system 100 of this embodiment includes a personnel information management server 1 (information processing apparatus), a business information management server 2 (second information processing apparatus) and a plurality of terminal apparatuses 3. The personnel information management server 1, the business information management server 2 and the terminal apparatuses 3 are communicably connected to one another via a communication network 4.

The personnel information management server 1 provides users with a cloud service of a personnel information management system that manages personnel information on employees or the like, and the business information management server 2 provides users with a cloud service of a business information management system that manages business information on various businesses (e.g. information on a business relevant to a health insurance association). A user(s) can access the personnel information management system and the business information management system when succeeding in authenticating with different authentication information (i.e. respective credentials). Hence, a user cannot log in to the business information management system with authentication information for the personnel information management system, or log in to the personnel information management system with authentication information for the business information management system. However, a user who has logged in to the business information management system can use some of functions of the personnel information management system even if the user does not own authentication information for the personnel information management system. Also, a user who has logged in to the personnel information management system can use some of functions of the business information management system even if the user does not own authentication information for the business information management system. That is, the personnel information management system and the business information management system have an interoperable relationship about their functions. In this embodiment, in order to simplify explanations, there is described a configuration that is required when a user who has logged in to the business information management system uses functions of the personnel information management system. In practice, however, the personnel information management server 1 and the business information management server 2 have configurations to realize the above interoperation. Operation to perform the interoperation of the functions of the systems is detailed below.

The personnel information management server 1 stores and manages a personnel information DB (database) on the personnel information. The personnel information management server 1 executes various programs, thereby performing various types of data processing relevant to the personnel information DB (e.g. processes to realize functions to register data of the personnel information, edit the same, display or print, as electronic forms (electronic documents), the same, etc.).

The business information management server 2 stores and manages a business information DB. The business information management server 2 executes various programs, thereby performing various types of data processing relevant to the business information DB (e.g. processes to realize functions to register data of the business information, edit the same, display or print, as electronic forms, the same, etc.).

Each terminal apparatus 3 is, for example, a terminal apparatus owned by a user of the personnel information management system and/or the business information management system. Examples of the terminal apparatus 3 include a smartphone, a tablet PC (Personal Computer), a mobile phone, a PDA (Personal Digital Assistant), a laptop PC and a desktop PC.

The terminal apparatus 3 accepts input operations of a user, sends the same to the personnel information management server 1 and the business information management server 2, and displays information sent and received from the servers.

The communication network 4 is, for example, the internet, but maybe another network, such as a LAN (Local Area Network).

FIG. 2 is a block diagram showing a functional configuration of the personnel information management server 1.

As shown in FIG. 2, the personnel information management server 1 includes a CPU 11 (Central Processing Unit; processor) (a login section, an accepting section, a notifying section, a removing section, a display control section, an authentication section), a RAM 12 (Random Access Memory), a storage unit 13, an operation unit 14, a display unit 15 and a communication unit 16. These components of the personnel information management server 1 are connected to one another via a bus 17.

The CPU 11 controls the components of the personnel information management server 1. The CPU 11 reads a program(s) specified from among system programs and application programs stored in the storage unit 13, opens the read program(s) in a work area of the RAM 12, and performs a process among various processes in accordance with the opened program(s).

The RAM 12 is, for example, a volatile memory, and has the work area where various programs and data read by the CPU 11 are temporarily stored.

The storage unit 13 is a storage unit which is constituted of, for example, an HDD (Hard Disk Drive), an SSD (Solid State Drive) and/or the like, and in and from which data and programs are writable and readable. The storage unit 13 stores programs 13*a*, an account DB 13*b*, a personnel information DB 13*c*, an item table 13*d*, an approval item table 13*e* (removal instruction information, specifying information) and so forth.

The programs 13*a* include the above various system programs and application programs that are executed by the CPU 11.

In the account DB 13*b*, information on accounts of users of the personnel information management system (hereinafter may be referred to as personnel accounts) is registered. The information on the accounts contains, for each account, a unique ID, an email address and a password. In this embodiment, authentication information is constituted of a combination of an ID or an email address and a password.

The personnel information DB 13*c* is a database where the personnel information to be managed in the personnel information management system is registered.

The item table 13*d* and the approval item table 13*e* are table data that are used to prohibit execution of processes relevant to functions about the personnel information DB 13*c* and remove the prohibition. They are detailed below.

The operation unit 14 has, for example, a key input unit, such as a keyboard, and a pointing device, such as a mouse. The operation unit 14 accepts key inputs and position inputs, and outputs the operation information to the CPU 11.

The display unit 15 includes a display, such as an LCD (Liquid Crystal Display) or an organic EL (Electro-Luminescence) display. The display unit 15 displays various screens in accordance with instructions of display signals input from the CPU 11.

The communication unit 16 is constituted of, for example, a network card or the like. The communication unit 16 is communicably connected to the communication network 4, and communicates with apparatuses (e.g. the terminal apparatuses 3) on the communication network 4.

FIG. 3 is a block diagram showing a functional configuration of the business information management server 2.

As shown in FIG. 3, the business information management server 2 includes a CPU 21, a RAM 22, a storage unit 23, an operation unit 24, a display unit 25 and a communication unit 26. These components of the business information management server 2 are connected to one another via a bus 27.

The CPU 21 controls the components of the business information management server 2. The CPU 21 reads a program(s) specified from among system programs and application programs stored in the storage unit 23, opens the read program(s) in a work area of the RAM 22, and performs a process among various processes in accordance with the opened program(s).

The RAM 22 is, for example, a volatile memory, and has the work area where various programs and data read by the CPU 21 are temporarily stored.

The storage unit 23 is a storage unit which is constituted of, for example, an HDD, an SSD and/or the like, and in and from which data and programs are writable and readable. The storage unit 23 stores programs 23a, an account DB 23b, a business information DB 23c and so forth.

The programs 23a include the above various system programs and application programs that are executed by the CPU 21.

In the account DB 23b, information on accounts of users of the business information management system (hereinafter may be referred to as business accounts) is registered. The information on the accounts contains, for each account, a unique ID, an email address and a password.

The business information DB 23c is a database where the business information to be managed in the business information management system is registered.

Configurations of the operation unit 24, the display unit 25 and the communication unit 26 are the same as those of the operation unit 14, the display unit 15 and the communication unit 16 of the personnel information management server 1, respectively, and hence their detailed description is not repeated here.

Figure 4:
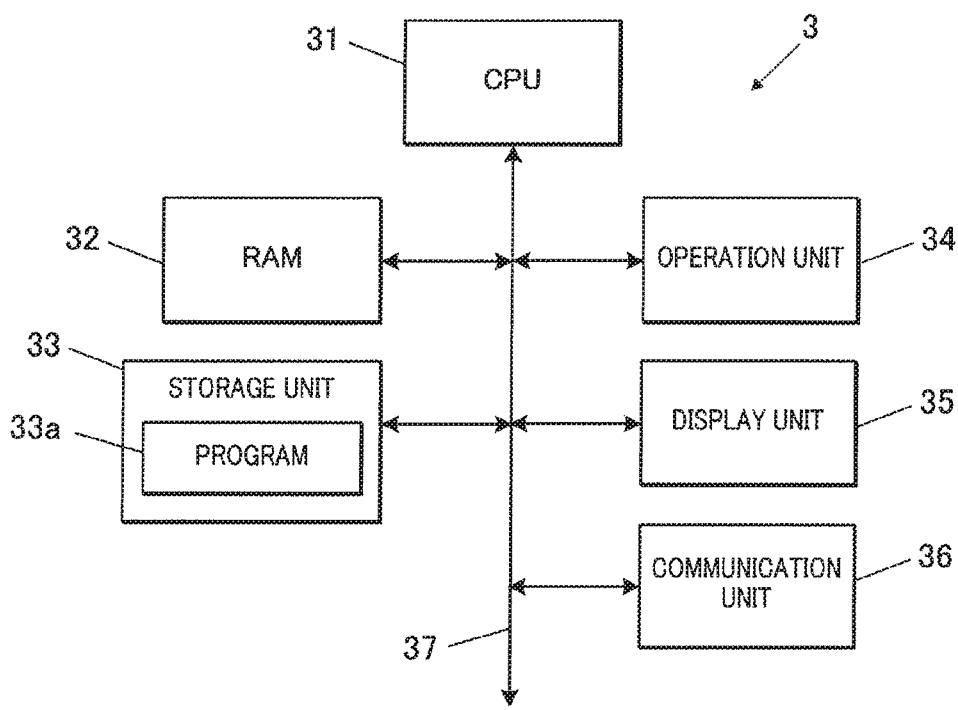
FIG. 4 is a block diagram showing a functional configuration of a terminal apparatus.

FIG. 4 is a block diagram showing a functional configuration of each terminal apparatus 3.

As shown in FIG. 4, the terminal apparatus 3 includes a CPU 31, a RAM 32, a storage unit 33, an operation unit 34, a display unit 35 and a communication unit 36. These components of the terminal apparatus 3 are connected to one another via a bus 37.

The CPU 31 controls the components of the terminal apparatus 3. The CPU 31 reads a program(s) specified from among system programs and application programs stored in the storage unit 33, opens the read program(s) in a work area of the RAM 32, and performs a process among various processes in accordance with the opened program(s). At the time, the CPU 31 stores the process result in the RAM 32, and causes the display unit 35 to display the process result as needed.

The RAM 32 is, for example, a volatile memory, and has the work area where various programs and data read by the CPU 31 are temporarily stored.

The storage unit 33 is a storage unit which is constituted of, for example, an HDD, an SSD and/or the like, and in and from which data and programs are writable and readable. The storage unit 33 stores programs 33a. The programs 33a include the above various system programs and application programs that are executed by the CPU 31. The application programs include an information display input program (what is called, a web browser) to realize a function to accept input operations of a user, send information based on the input operations to the personnel information management server 1 and the business information management server 2, and cause the display unit 35 to display information sent and received from the servers.

Configurations of the operation unit 34, the display unit 35 and the communication unit 36 are the same as those of the operation unit 14, the display unit 15 and the communication unit 16 of the personnel information management server 1, respectively, and hence their detailed description is not repeated here.

Next, login methods for logging in to the personnel information management system and the business information management system are described.

FIG. 5 is a schematic view to explain the login methods for logging in to the personnel information management system and the business information management system.

In the information processing system 100 of this embodiment, as shown on the left side in FIG. 5, it is possible to log in to the personnel information management system provided by the personnel information management server 1 using personnel accounts 1a. More specifically, when it is determined that authentication information input into the terminal apparatus 3 and sent to the personnel information management server 1 matches authentication information on one of the personnel accounts 1a registered in the account DB 13b, a login process of logging in to the personnel information management system is performed, and accordingly a login session starts. Hereinafter, this login method to the personnel information management system may be referred to as a first login method.

As shown on the right side in FIG. 5, it is possible to log in to the business information management system provided by the business information management server 2 using business accounts 2a. More specifically, when it is determined that authentication information input into the terminal apparatus 3 and sent to the business information management server 2 matches authentication information on one of the business accounts 2a registered in the account DB 23b, a login process of logging in to the business information management system is performed, and accordingly a login session starts.

The personnel accounts 1a that enable logins to the personnel information management system are managed in the account DB 13b of the personnel information management server 1, and the business accounts 2a that enable logins to the business information management system are managed in the account DB 23b of the business information management server 2. Hence, logins to the personnel information management system with authentication information that enables logins to the business information management system are impossible.

However, there are some cases in which users who own the business accounts 2a for the business information management system (hereinafter referred to as user(s) of the business information management system (first user(s))) should be permitted to access the personnel information management system, for example, a case where information in the personnel information management system is required for a work in the business information management system. In such cases, if the personnel accounts 1a for the personnel information management system are issued to the respective users of the business information management system, the number of accounts becomes large. This increases the load of account management. Further, this method cannot deal with a demand of control on a disclosure range of the personnel information in the personnel information management system to the users of the business information management system.

Hence, in the information processing system 100 of this embodiment, predetermined operation(s) in the business information management system after a login to the business information management system with a business account 2a enables a login to the personnel information management system via the business information management system, and for this login to the personnel information management system via the business information management system, different authentication is required to view the personnel information. This can prevent increase in the number of accounts for the personnel information management system and also can control disclosure of the personnel information to the users of the business information management system. Hereinafter, the login method to the personnel information management system via the business information management system may be referred to as a second login method. As shown in FIG. 5, for logins to the personnel information management system by the second login method, a special account(s) 1b (predetermined account(s)) usable only in the second login method is used. This special account 1b is shared by the users who own the business accounts 2a for the business information management system. Further, hereinafter, the login method to the business information management system using the business accounts 2a maybe referred to as a third login method.

Hereinafter, the second login method to the personnel information management system is described in detail.

FIG. 6 shows a login screen 41 to log in to the business information management system.

The login screen 41 is a screen that is displayed by the display unit 35 when a program of a browser is executed in the terminal apparatus 3, and a predetermined website to log in to the business information management system provided by the business information management server 2 is accessed. On the login screen 41, a text box A1 where an ID of a business account 2a or an email address used for a login is input, a text box A2 where a password is input, and a login button B1 are displayed.

When, by input operations to the operation unit 34 of the terminal apparatus 3, an ID or an email address is input to the text box A1 and a password is input to the text box A2, and an input operation to select the login button B1 is performed in this state, the input authentication information is sent to the business information management server 2 and compared with authentication information stored in the account DB 23b. If the input authentication information matches authentication information on one of the registered business accounts 2a (i.e. if it is determined that the input authentication information is proper), the CPU 21 of the business information management server 2 performs the login process of logging in to the business information management system with the business account 2a, and accordingly the login session starts (third login method).

Figure 7:
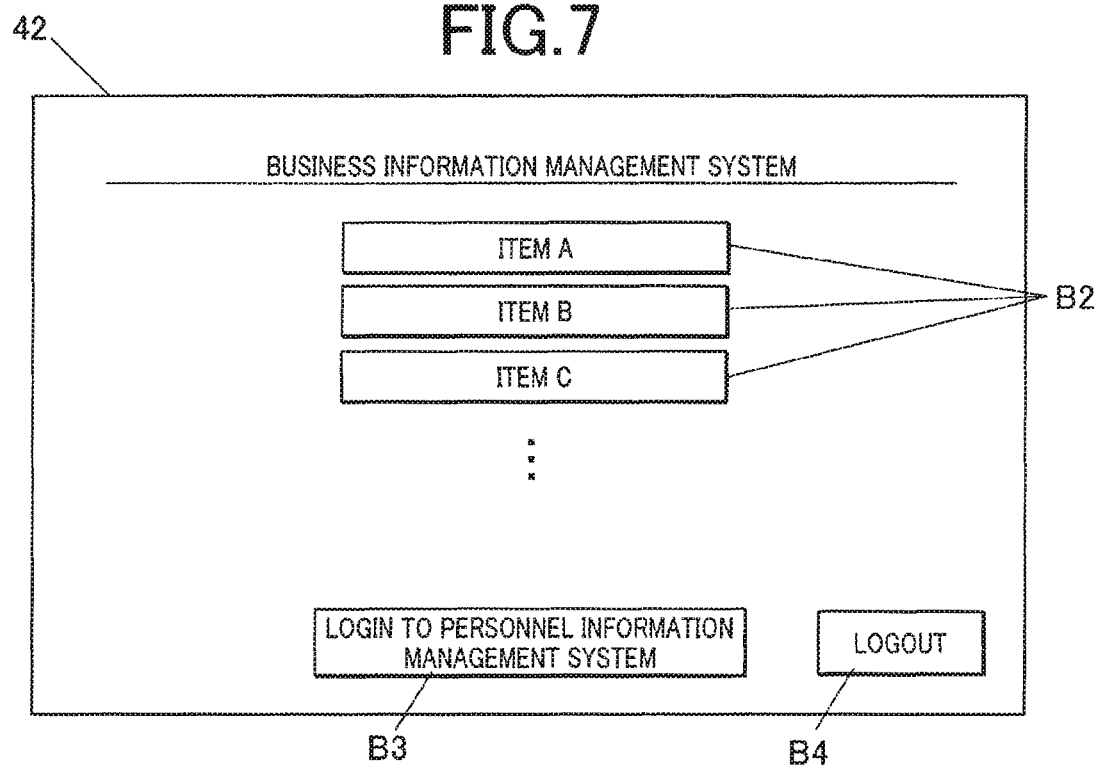
FIG. 7 shows a business information management menu screen.

FIG. 7 shows a business information management menu screen 42 displayed by the login to the business information management system.

On this business information management menu screen 42 (top screen of the business information management system), item buttons B2 to perform various functions relevant to business information management, a login button B3 to log in to the personnel information management system by the second login method, and a logout button B4 to log out of the business information management system are displayed.

By an input operation to select the login button B3 on the business information management menu screen 42, a login to the personnel information management system by the second login method is performed.

When the login by this second login method is performed, on the personnel information management system, a login process with the above-described special account 1b (hereinafter, the name of this special account 1b is referred to as "user01") is performed, the special account 1b being used when the login is via the business information management system.

Figure 8:
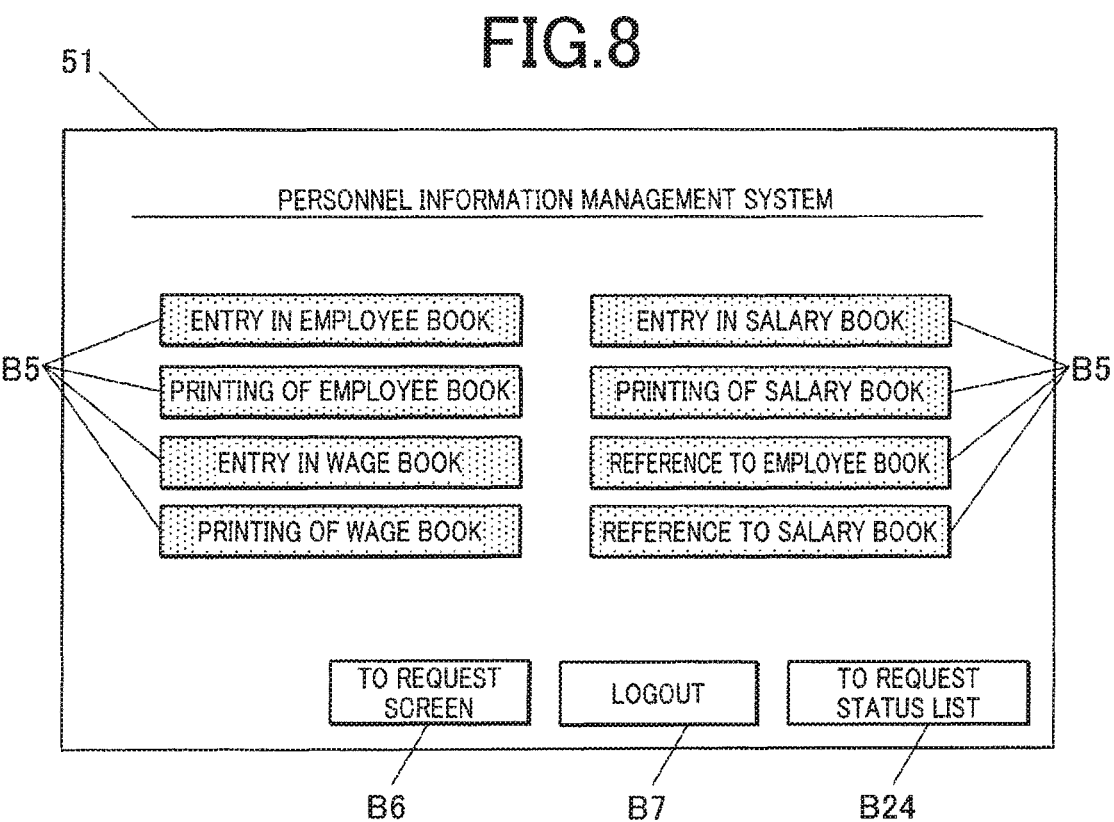
FIG. 8 shows a default screen displayed by a login to the personnel information management system via the business information management system.

FIG. 8 shows a default screen 51 displayed by the login to the personnel information management system via the business information management system.

On the default screen 51, item buttons B5 representing items of functions executable in the personnel information management system, a request button B6 to request use (to make a use request) of the personnel information in the personnel information management system, a logout button B7 to log out of the personnel information management system, and a request status list button B24 (request status button) to display a request status list screen, which is described below, are displayed. At this stage, to none of the item buttons B5, an input operation to select can be performed. That is, on this default screen 51, execution of processes relevant to all the items is prohibited. The default screen 51 is displayed in accordance with set contents of the item table 13d stored in the storage unit 13 of the personnel information management server 1.

The user of the business information management system performs an input operation to select the request button B6, so that a use request screen to make a use request of the personnel information management system can be displayed.

FIG. 9 shows an example of the contents of the item table 13d.

The item table 13d is data in which, for each of the items of the functions of the personnel information management system, an item ID, an item name and executability are set. Among these, the executability is a setting to specify whether or not a process for an item corresponding to an item button B5 should be performed in response to an input operation to select the item button B5 on the default screen 51, namely, whether or not an input operation to select the item button B5 should be effective.

In the example shown in FIG. 9, the executability of each of an item ID 101 (Entry in Employee Book), an item ID 102 (Printing of Employee Book), an item ID 103 (Entry in Wage Book), an item ID 104 (Printing of Wage Book), an item ID 105 (Entry in Salary Book), an item ID 106 (Printing of Salary Book), an item ID 107 (Reference to Employee Book) and an item ID 108 (Reference to Salary Book) is "Inexecutable". Accordingly, on the default screen 51 shown in FIG. 8, to none the item buttons B5, an input operation to select can be performed. That is, on the default screen 51 displayed by a login by the second login method, execution of the processes relevant to all the items of the personnel information management system is prohibited (use of the functions of all the items is prohibited).

FIG. 10 shows a use request screen 52 of the personnel information management system.

On the use request screen 52, a text box A3 where a requester name is input, a text box A4 where an email address of the requester is input, a text box A5 where an employee number of the requester is input, a text box (or pull-down menu) A6 where a category of an intended use is input (or selected), a text box A7 where an intended use (purpose of a use request) is input, a text box A8 where a date and time at which using begins are input, a text box A9 where a date and time at which the using ends are input, a return button B8 to return to the default screen 51, and a request button B9 to make/submit a use request with the contents input to the text boxes A3 to A7 are displayed.

The user of the business information management system inputs necessary matters to the text boxes A3 to A9 and then performs an input operation to select the request button B9, so that the use request of the personnel information management system can be made/submitted.

When the request button B9 is selected to make/submit the use request, as shown in FIG. 11, a request status list screen 53 is displayed by the display unit 35.

On the request status list screen 53, for each submitted use request at present, the "Request No.", "Login Account", "Category of Intended Use", "Using Date and Time (Begin)", "Using Date and Time (End)" and "Status" are displayed. Among these, the "Status" indicates whether or not a manager of the personnel information management system has approved or not yet approved each request. Further, on the request status list screen 53, a request button B10 to make another use request of the personnel information, a logout button B11 to log out of the personnel information management system, and a return button B25 to return to the default screen 51 are displayed.

Meanwhile, when the use request has been made on the use request screen 52, a predetermined manager (second user) of the personnel information management system is notified about the contents input to the text boxes A3 to A9. When, in response to this notification, the manager performs a predetermined approval process to approve the use request, the requester can use the personnel information management system within a range corresponding to the contents of the use request. Further, an email indicating that the use request has been approved is sent to the email address of the requester, the email address being input on the use request screen 52. Here, the manager may be a person who is in charge of management of operation of the personnel information management system. Alternatively, a user who has logged in to the personnel information management system with a personnel account 1a may be provided with a right to approve the use request, and accordingly this user can be the manager. Further, the manager may be notified on the personnel information management system or by another system, such as an email, that the use request has been made. Operation screens for the manager of the personnel information management are described below.

FIG. 12 shows an example of contents of the email that is sent to the email address of the user of the business information management system when the use request has been approved by the manager. By this email, the user of the business information management system is notified that the use request has been approved.

When the use request has been approved by the manager, the request status list screen 53 is updated as shown in FIG. 13. On the request status list screen 53, the status of the row of the approved use request has been updated to "Approved". By an input operation to select the row of the approved use request on the request status list screen 53, a personnel information management menu screen 54 to use the function(s) of the personnel information management system is displayed.

FIG. 14 shows the personnel information management menu screen 54 of the personnel information management system. On the menu screen 54 shown in FIG. 14, the item buttons B5 to perform the various functions of the personnel information management system, a return button B12 to return to the request status list screen 53, and a logout button B13 to log out of the personnel information management system are displayed. On this menu screen 54, to each of the item buttons B5 for the functions of the "Reference to Employee Book" and the "Reference to Salary Book", an input operation to select can be performed. That is, on the menu screen 54, the prohibition on the execution of the processes relevant to the functions of the "Reference to Employee Book" and the "Reference to Salary Book" is removed. Further, to let the user of the business information management system know that the prohibition on the execution thereof has been removed, the item buttons B5 for the functions of the "Reference to Employee Book" and the "Reference to Salary Book" and the other item buttons B5, the execution of the processes of which are prohibited, are displayed in different forms.

This menu screen 54 is displayed in accordance with set contents of the approval item table 13e stored in the storage unit 13 of the personnel information management server 1. This approval item table 13e is described below.

Next, screens displayed for the manager of the personnel information management system are described.

Figure 15:
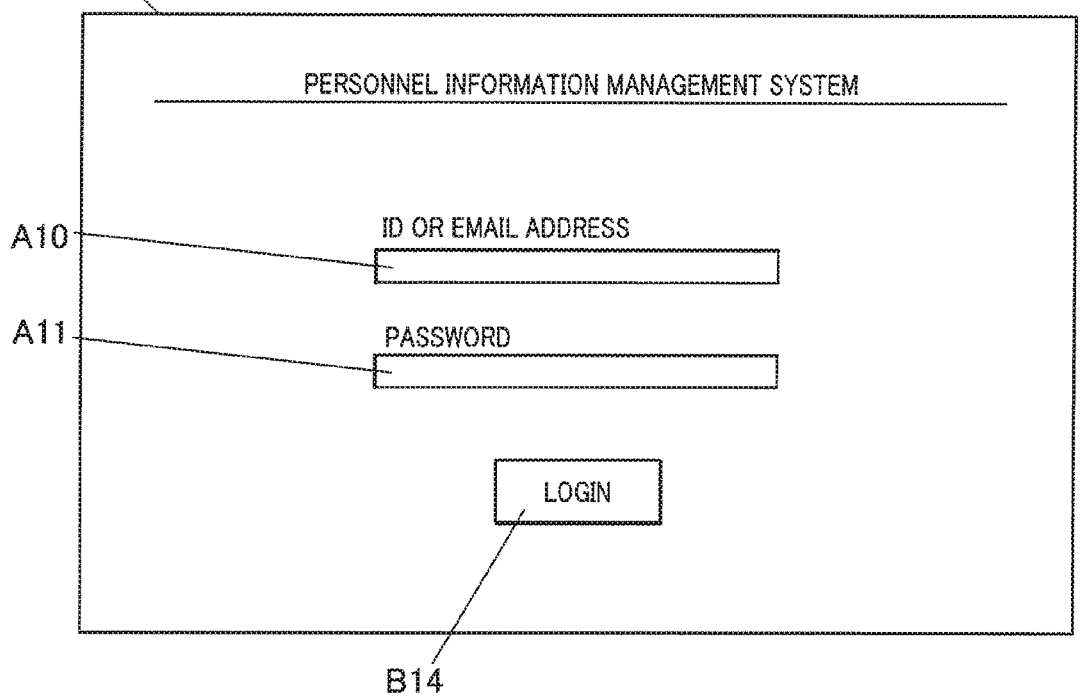
FIG. 15 shows a login screen to log in to the personnel information management system by a first login method.

FIG. 15 shows a login screen 55 for the manager of the personnel information management system to log in to the personnel information management system by the first login method. On the login screen 55, a text box A10 where an ID of a personnel account 1a or an email address used for a login is input, a text box A11 where a password is input, and a login button B14 are displayed. When an ID or an email address is input to the text box A10, a password is input to the text box A11, and an input operation to select the login button B14 is performed in this state, the input authentication information is sent to the personnel information management server 1 and compared with authentication information stored in the account DB 13b. If the input authentication information matches authentication information on one of the registered personnel accounts 1a (if it is determined that the input authentication information is proper), the CPU 11 of the personnel information management server 1 performs the login process of logging in to the personnel information management system with the personnel account 1a, and accordingly the login session starts.

Figure 16:
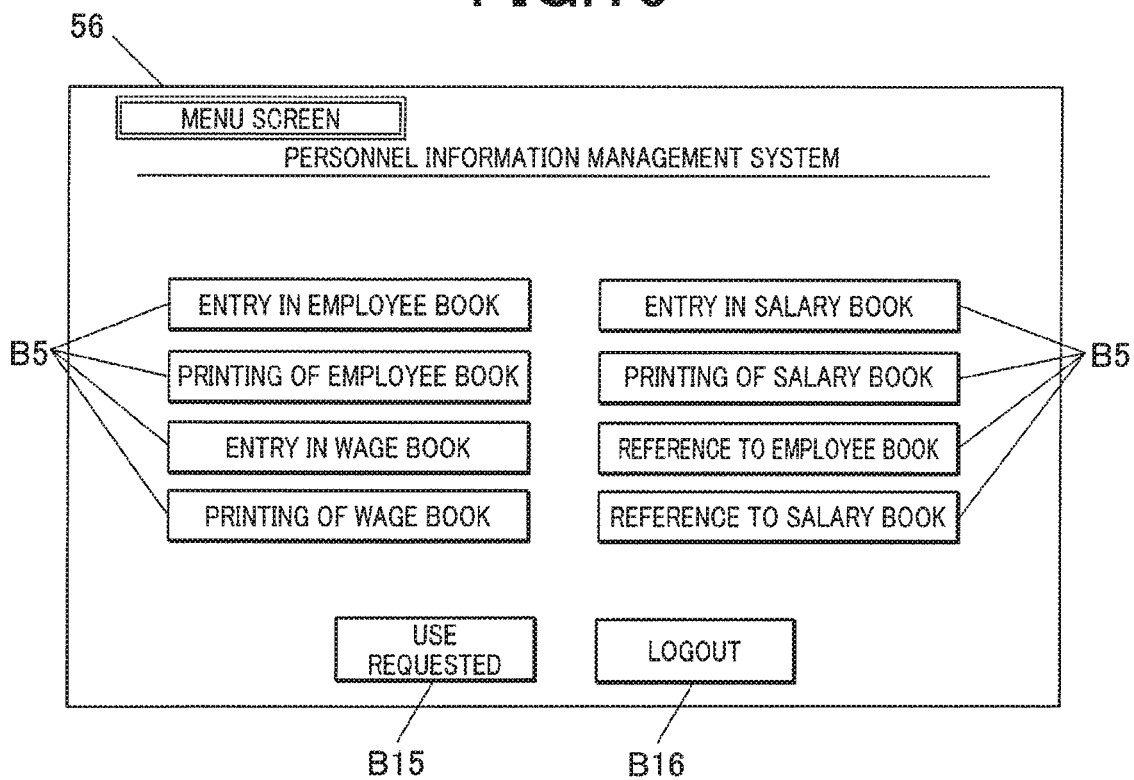
FIG. 16 shows a personnel information management menu screen displayed by a login to the personnel information management system by the first login method.

FIG. 16 shows a personnel information management menu screen 56 displayed by the login to the personnel information management system by the first login method. On the personnel information management menu screen 56, the item buttons B5 same as those on the personnel information management menu screen 54 shown in FIG. 14, a use request display button B15 to display a request status list screen 57 (shown in FIG. 17) relevant to use requests of the personnel information management system from the users of the business information management system, and a logout button B16 to log out of the personnel information management system are displayed. On this menu screen 56, to any of the item buttons B5, an input operation to select can be performed. The use request display button B15 also has a function to notify its user that a use request(s) of the personnel information management system has been made. Hence, the use request display button B15 is displayed only when a use request(s) has been made. Alternatively, the use request display button B15 may be displayed always, and when a use request(s) has been made, may be highlighted.

FIG. 17 shows the request status list screen 57. On the request status list screen 57, for each submitted use request, the "Request No.", "Login Account", "Category of Intended Use", "Using Date and Time (Begin)", "Using Date and Time (End)" and "Status" are displayed. Among these, the "Status" indicates an approval status of a request by the manager of the personnel information management system. If an input operation to select the row of, among the use requests, a use request to be approved or rejected is performed, an (individual) approval screen to approve or reject this use request is displayed. On the request status list screen 57, a return button B17 to return to the personnel information management menu screen 56 and a logout button B18 to log out of the personnel information management system are also displayed. On the request status list screen 57, all the use requests having been made so far may be displayed as a list, or those the "Using Date and Time (End)" of which has passed or those which have been approved or rejected may be excluded from the list. This can be appropriately set by the manager.

FIG. 18 shows an approval screen 58. On the approval screen 58, the contents input on the use request screen 52 shown in FIG. 10, an approve button B19 to approve the use request concerned, a reject button B20 to reject the use request concerned, and a return button B21 to return to the request status list screen 57 are displayed. If an input operation to select the approve button B19 is performed, an item update screen 59 shown in FIG. 19A is displayed. The item update screen 59 is a screen to update the set contents of the approval item table 13e. On the other hand, if an input operation to select the reject button B20 is performed, the "Status" on the request status list screen 53 of the display unit 35 of the terminal apparatus 3 which the user of the business information management system owns is updated to "Rejected".

FIG. 19A shows the item update screen 59 before updating (i.e. in a default state). On the item update screen 59, with each of the items corresponding to the respective functions of the personnel information management system, the "Item Name" and "Executability" are correlated and displayed. If an input operation to select the region of the executability of an item to be updated is performed, the content displayed in the region is changed. For example, if an input operation to select the region of the executability of the "Entry in Employee Book" shown in FIG. 19A is performed, the content displayed in the region thereof is changed from "Inexecutable" to "Executable". On the item update screen 59, an enter button B22 to determine/fix the set contents of the approval item table 13e and a return button B23 to return to the approval screen 58 are displayed.

FIG. 19B shows the item update screen 59 after updating. In the example shown in FIG. 19B, the executability of each of the "Reference to Employee Book" and the "Reference to Salary Book" has been changed from "Inexecutable" to "Executable". If an input operation to select the enter button B22 is performed at the time, the approval of the use request is determined/fixed, the set contents of the approval item table 13e are updated, and the email shown in FIG. 12 is sent to the user (requester) of the business information management system, the user who has made the use request.

FIG. 20 shows an example of the contents of the approval item table 13e.

The approval item table 13e is table data where the set contents same as those of the item table 13d are stored for each account (login account) which has made a use request(s). The contents of the sections except the "Login Account" and the "Approver Account" in the approval item table 13e are, in the default state, namely, at the stage at which the login session has just started by the second login method, the same as those of the item table 13d. The "Login Account" shows an account (special account 1b) used for the login session by the second login method. The "Approver Account" shows an account (personnel account 1a) of the manager of the personnel information management system, the manager who has approved the use request. The settings for the "Executability" in the approval item table 13e can be changed according to the contents of the use request. FIG. 20 shows the example where the executability of each of the item ID 107 (Reference to Employee Book) and the item ID 108 (Reference to Salary Book) has been changed from "Inexecutable" to "Executable" in response to the approval process for the use request from the login account "user01" performed by the manager having the approver account "adm01".

When the approval item table 13e has been updated as shown in FIG. 20, on the basis of the contents of the updated approval item table 13e, the menu screen 54 is updated and displayed as shown in FIG. 14. Because the executability of each of the item ID 107 and the item ID 108 is "executable" in the updated approval item table 13e, on the item screen 54, by input operations to select their corresponding item buttons B5, the functions (reference to an employee book and reference to a salary book) corresponding to the item buttons B5 can be performed. That is, on the menu screen 54 shown in FIG. 14, the prohibition on the execution of the processes relevant to these items is removed.

Next, control procedures of an authentication process and the approval process in the personnel information management system are described.

FIG. 21 is a flowchart showing the control procedure of the authentication process.

This authentication process is performed when a login to the personnel information management system by the second login method is performed, the second login method being the login method to the personnel information management system via the business information management system.

When the authentication process is started, the CPU 11 causes the display unit 35 of the terminal apparatus 3 to display the default screen 51 in the state shown in FIG. 8 (Step S101), and causes the display unit 35 to display the use request screen 52 shown in FIG. 10 in response to an input operation to the request button B6 so as to accept a use request of the personnel information management system (Step S102).

When accepting the use request of the personnel information management system, the CPU 11 causes the display unit 35 to display the request status list screen 53 (Step S103). Next, the CPU 11 determines whether or not the use request accepted in Step S102 has been approved by the manager (Step S104).

When determining that the use request has not been approved yet (Step S104; NO), the CPU 11 returns to Step S103.

On the other hand, when determining that the use request has been approved (Step S104; YES), the CPU 11 updates the request status list screen 53 as shown in FIG. 13 (Step S105).

Next, the CPU 11 selects the row of the approved use request selected (desired) by a user (user of the business information management system) on the request status list screen 53 shown in FIG. 13 through the operation unit 34 (Step S106).

Next, the CPU 11 causes the display unit 35 to display the menu screen 54 shown in FIG. 14 on the basis of the contents in the updated approval item table 13e (shown in FIG. 20) for the selected row of the approved use request (Step S107) and ends the authentication process.

FIG. 22 is a flowchart showing the control procedure of the approval process.

This approval process is performed when a login to the personnel information management system by the manager thereof by the first login method is performed.

When the approval process is started, the CPU 11 causes the display unit 35 of the terminal apparatus 3 to display the menu screen 56 shown in FIG. 16 (Step S201). Next, the CPU 11 determines whether or not an input operation to select the use request display button B15 has been performed on the menu screen 56 (Step S202).

When determining that no input operation to select the use request display button B15 has been performed (Step S202; NO), the CPU 11 ends the approval process.

On the other hand, when determining that an input operation to select the use request display button B15 has been performed (Step S202; YES), the CPU 11 causes the display unit 35 to display the request status list screen 57 shown in FIG. 17 (Step S203).

Next, the CPU 11 determines whether or not an input operation to select a row of any use request has been performed on the request status list screen 57 shown in FIG. 17 (Step S204).

When determining that no input operation to select a row of any use request has been performed (Step S204; NO), the CPU 11 ends the approval process.

On the other hand, when determining that an input operation to select a row of a use request has been performed (Step S204; YES), the CPU 11 causes the display unit 35 to display, like the one shown in FIG. 18, the approval screen 56 that shows the contents of the selected use request (Step S205).

Next, the CPU 11 determines whether or not an input operation to select the approve button B19 has been performed on the approval screen 58 shown in FIG. 18 (Step S206).

When determining that an input operation to select the approve button B19 has been performed (Step S206; YES), the CPU 11 causes the display unit 35 to display the item update screen 59 shown in FIG. 19A (Step S207).

Next, the CPU 11 determines whether or not an input operation to change the executability of any of the items has been performed on the item update screen 59 shown in FIG. 19A (Step S208).

When determining that no input operation to change the executability of any of the items has been performed (Step S208; NO), the CPU 11 repeats Step S208.

On the other hand, when determining that an input operation (s) to change the executability of one or more of the items has been performed (Step S208; YES), the CPU 11 updates the approval item table 13*e* (Step S209) and ends the approval process.

When determining, in Step S206, that no input operation to select the approve button B19 has been performed (Step S206; NO), the CPU 11 ends the approval process.

As described above, according to this embodiment, the personnel information management server 1 of the information processing system 100 performs the login process on the basis of the special account 1*b* (predetermined account) assigned to a user of the business information management system (first user). Further, when having performed the login process, the personnel information management server 1 accepts a use request of a predetermined function(s) from the user of the business information management system. Still further, the personnel information management server 1 notifies a predetermined manager of the personnel information management system (second user) about the accepted use request, and removes prohibition on execution of a process(es) relevant to the predetermined function(s) on the basis of removal instruction information from the notified predetermined manager.

Thus, as the first stage authorization, the login process is performed, and as the second stage authentication, the operation(s) by the predetermined manager of the personnel information management system, who has been notified about a use request, to remove the prohibition on the execution of the above is performed, namely, the approval is obtained from the predetermined manager of the personnel information management system. Consequently, the user of the business information management system can use the predetermined function(s) of the personnel information management server 1. Hence, authentication can be easily performed without lowering the security level.

Further, the special account 1*b* (predetermined account) is an account usable under the condition that the first user has logged in to the business information management server 2 (second information processing apparatus) which is different from the personnel information management server 1. Hence, the user of the business information management system can access the personnel information management server 1 on the assumption that the user has logged in to the business information management server 2 using his/her own account (business account 2*a*) in advance. Hence, authentication to access the personnel information management server 1 can be enhanced.

Further, the personnel information management server 1 has predetermined functions that are usable/available and different in type, and removes the prohibition on the execution of the process relevant to the predetermined function specified on the basis of information (specifying information) in the approval item table 13*e*. Hence, flexible control can be performed for the removal of the prohibition on the execution of the predetermined function(s).

Further, when having performed the login process, the personnel information management server 1 performs control to display, to the user of the business information management system (first user), the item buttons B5 to perform the processes relevant to the respective predetermined functions in the inoperable state. Hence, at the stage at which the login process has been performed, the user of the business information management system can know what function(s) the personnel information management system has.

Further, when having removed the prohibition on the execution of the process relevant to the predetermined function specified on the basis of the information (specifying information) in the approval item table 13*e*, the personnel information management server 1 switches the state of the item button B5 to perform the process relevant to the predetermined function to the operable state and performs control to display the item button to the user of the business information management system (first user). Hence, the user of the business information management system can know which function(s) becomes usable/available.

Further, to accept the use request from the user of the business information management system, the personnel information management server 1 demands the user of the business information management system to provide a purpose of the use request. Hence, flexible control to remove the prohibition on the execution of only the predetermined function(s) which the user of the business information management system desires to use can be performed in accordance with the use request from the user of the business information management system.

In the above, as a computer readable medium storing the programs of the present invention, the HDD and/or the SSD of the storage unit 13 are used. This is not intended to limit the present invention. The computer readable medium may be a flash memory or a portable recording/storage medium, such as a CD-ROM. Further, as a medium to provide data of the programs of the present invention via a communication line, a carrier wave can be used.

The matters described in the above embodiment(s) are merely some of preferred examples of the information processing apparatus, the information processing method and the storage medium of the present invention, and not intended to limit the present invention.

For example, in the above embodiment, the personnel information management server 1 that provides the personnel information management system is described as the information processing apparatus. This is not intended to limit the present invention. For example, the present invention is applicable to an information processing apparatus that provides a system which performs control to display electronic forms.

Further, in the above embodiment, on the default screen 51, execution of the processes relevant to all the items is prohibited. This is not intended to limit the present invention. For example, on the default screen 51, a process(es) relevant to some of the items may be made to be available (executable). This permits, in common, the users who log in to the personnel information management system by the second login method to use a function(s) of some item(s) of the personnel information management system.

Further, needless to say, the detailed configurations and detailed operations of the components of the information processing system 100 in the above embodiment can be appropriately modified without departing from the scope of the present invention.

In the above, one or more embodiments of the present invention are described. However, the scope of the present invention is not limited thereto. The scope of the present invention includes the scope of claims below and the scope of their equivalents.

What is claimed is:

1. An information management system comprising:
   a first information management server; and
   a second information management server connected to the first information management server via a network and including a processor that performs a first function, wherein
   the first function includes:
      a login process accepting function that accepts a login process from a first account to the second information management server under a condition that the first account has logged in to the first information management server;
      a use request accepting function that accepts a use request of a predetermined second function from the first account when the login process accepted by the login process accepting function has been performed;
      a notifying function that specifies, as an approver, a predetermined second account that logs in to the second information management server at a timing when the use request is accepted by the use request accepting function, and notifies the second account that is the specified approver about the use request accepted by the use request accepting function; and
      a removing function that removes prohibition on execution of the predetermined second function for the first account based on removal instruction information from the second account specified as the approver by the notifying function.

2. The information management system according to claim 1, wherein
   the predetermined second function includes a plurality of second functions that are different in type,
   the removal instruction information contains specifying instruction that specifies, from among the plurality of second functions that are different in type, a second function that is a target for the removal by the removing function, and
   the removing function removes the prohibition on the execution of the second function specified based on the specifying information.

3. The information management system according to claim 2, wherein the first function further includes a display control function that performs control to display, to the first account, item buttons for the respective second functions that are different in type in an inoperable state when the login process accepted by the login process accepting function has been performed.

4. The information management system according to claim 3, wherein when the prohibition on the execution of the second function specified based on the specifying information has been removed, the display control function switches a state of an item button for the second function to an operable state and performs control to display the item button to the first account.

5. The information management system according to claim 1, wherein the use request accepting function demands a purpose of the use request from the first account to accept the use request.

6. The information management system according to claim 1, wherein the use request accepting function demands a using period of the second function from the first account to accept the use request.

* * * * *